Patented Nov. 19, 1940

2,222,355

UNITED STATES PATENT OFFICE 2,222,355

METHOD OF TREATING RUBBER

James A. Merrill, Akron, Ohio, assignor to Wingfoot Corporation, Akron, Ohio, a corporation of Delaware No Drawing. Application November 6, 1935, Serial No. 48,547

5 Claims. (Cl. 260—816)

This invention relates to a method of treating rubber. More particularly, it relates to a method of preparing rubber in powdered or granular form. It also includes the products of the process.

One object of the invention is to convert rubber into a powder which may be used as a molding powder, as a filler, as hard rubber dust, etc. Another object is to obtain this powder without the addition of diluent materials, i. e., materials other than those in a standard vulcanizable rubber formula. Other objects and advantages will appear as the description proceeds.

In the practice of the invention, an accelerator or a mixture of accelerators together with the other necessary curing agents is added to rubber, as by milling. The mix is then dissolved in a rubber solvent capable of being steam distilled. This solution is emulsified in a quantity of water and, with constant agitation, the solvent is steam distilled, leaving the rubber suspended in the water in small particles. The temperature is maintained sufficiently high and long enough to render the particles cured or partially cured and, consequently, free from tack. They are then filtered off and dried.

In a specific example for producing a semi-cured hard rubber powder, 100 grams of a rubber mix consisting of

| | Parts by weight |
|---|---|
| Rubber | 100 |
| Stearic acid | 1 |
| Sulphur | 50 |
| Zinc oxide | 10 |
| Mercaptobenzothiazole | 5 |
| Zinc dimethyl dithiocarbamate | 5 | were dissolved in 400 grams of benzene and emulsified in 1500 cc. of water containing two grams of oleic acid as ammonium oleate (as an emulsifying agent). With continuous agitation the benzol was slowly driven off by gradually raising the temperature to 90 degrees C. during one and one half hours. Two hundred grams of calcium chloride were then added to elevate the boiling point of the solution and the temperature was raised to 110 degrees C. for two hours. The product was then filtered, washed, and dried. The resultant particles were spherical in shape and varied in size from a powder to as large as ordinary buckshot. They were of the consistency of a semi-cured hard rubber.

It is to be understood that the invention is not limited to the specific conditions of the above example. If desired, the rubber may be dissolved and the compounding ingredients subsequently dispersed in the resultant solution. Any vulcanizable rubber formula may be used depending on the kind of rubber powder desired. However, for practical purposes, it will be generally preferable to employ a rubber formula which is capable of being vulcanized at rather low temperatures and in a comparatively short time. It will thus be understood that rubber formulae varying from those which produce hard rubber on vulcanization may be employed in the practice of the invention. In the above formula, for example, the sulphur may be reduced to 3 parts or less by weight and the accelerators, to as low as .5 part each. Other compounding ingredients such as barytes, lithopone, carbon black, pine tar, etc. may be added, if desired. Similarly, other vulcanizing agents than sulphur may be used. While accelerators are not entirely necessary, for practical purposes a sufficiently active accelerator composition is desirable which is capable of inducing sufficient vulcanization to eliminate tackiness at temperatures of 90–110° C. in not too long a time.

Similarly, ammonium oleate is merely representative of the large group of possible emulsifying agents. Furthermore, the temperatures and times may be varied widely while accomplishing the desired result, depending both on the rubber formula employed and on the type of product desired.

Therefore, although only the preferred form of the invention has been described in detail, it will be apparent to those skilled in the art that various modifications may be made therein without departing from the spirit of the invention or the scope of the appended claims, in which it is intended to cover by suitable expression all features of patentable novelty inherent in the invention.

What I claim is:

1. The method of preparing powdered or granulated rubber which comprises dispersing the rubber and suitable compounding and vulcanizing ingredients in a rubber solvent capable of being steam distilled, emulsifying the rubber solution in water, applying heat to eliminate the rubber solvent and at least partially cure the rubber, and separating the rubber particles.

2. The method of preparing powdered or granulated rubber which comprises milling into rubber suitable compounding and vulcanizing ingredients, dispersing the mix in a rubber solvent capable of being steam distilled, emulsifying the rubber solution in water, applying heat to eliminate the rubber solvent and at least partially cure the rubber, and separating the rubber particles.

3. The method of preparing powdered or granulated rubber which comprises dispersing uncured rubber and suitable compounding and vulcanizing ingredients in a rubber solvent capable of being steam distilled, emulsifying the rubber solution in water, applying heat to eliminate the rubber solvent and at least partially cure the rubber, and separating the rubber particles.

4. The method of preparing a hard rubber powder which comprises dispersing in a rubber solvent capable of being steam distilled a rubber mix which will on being vulcanized produce hard rubber, emulsifying the rubber solution in water, applying heat to eliminate the rubber solvent and at least partially cure the rubber, and separating the rubber particles.

5. In a process of preparing powdered or granular rubber, the steps comprising dispersing the rubber and suitable compounding and vulcanizing ingredients in a rubber solvent capable of being steam distilled, emulsifying the rubber solution in water, and applying heat to eliminate the rubber solvent and at least partially cure the rubber.

JAMES A. MERRILL.